US012785460B2

(12) United States Patent
Shi et al.

(10) Patent No.: US 12,785,460 B2
(45) Date of Patent: Nov. 3, 2026

(54) WIRELESS POWER TRANSFER CONTROL LOOP WITH VARIABLE GAIN COEFFICIENTS

(71) Applicant: Apple Inc., Cupertino, CA (US)

(72) Inventors: Lixin Shi, San Jose, CA (US); Alin I Gherghescu, Campbell, CA (US); Zaid A AbuKhalaf, Sunnyvale, CA (US); Adam L Schwartz, Redwood City, CA (US); Stephen C Terry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 91 days.

(21) Appl. No.: 19/035,599

(22) Filed: Jan. 23, 2025

(65) Prior Publication Data

US 2025/0309700 A1 Oct. 2, 2025

Related U.S. Application Data

(60) Provisional application No. 63/709,899, filed on Oct. 21, 2024, provisional application No. 63/571,480, filed on Mar. 29, 2024.

(51) Int. Cl.
*H02J 50/80* (2016.01)
*H02J 50/10* (2016.01)

(52) U.S. Cl.
CPC .............. *H02J 50/80* (2016.02); *H02J 50/10* (2016.02)

(58) Field of Classification Search
CPC .. H02J 50/80; H02J 50/10; H02J 50/12; H02J 7/90; H02J 7/42; H02J 50/60; H02J 50/90; H01F 38/14
See application file for complete search history.

(56) References Cited

U.S. PATENT DOCUMENTS

| | | | | |
|---|---|---|---|---|
| 8,035,255 | B2 * | 10/2011 | Kurs | B60L 50/20 307/104 |
| 8,129,864 | B2 * | 3/2012 | Baarman | H02J 50/10 307/104 |
| 8,482,158 | B2 * | 7/2013 | Kurs | H01F 38/14 307/104 |
| 10,938,251 | B1 * | 3/2021 | Mehrabi | H02J 50/12 |
| 11,502,555 | B2 * | 11/2022 | Kim | H02J 50/80 |
| 2009/0174263 | A1 * | 7/2009 | Baarman | H02J 50/10 307/104 |
| 2012/0329405 | A1 * | 12/2012 | Lee | H02J 50/12 455/73 |

(Continued)

FOREIGN PATENT DOCUMENTS

| | | |
|---|---|---|
| CN | 111711250 A | 9/2020 |
| CN | 111740504 B | 5/2022 |

(Continued)

*Primary Examiner* — Menatoallah Youssef
*Assistant Examiner* — Michael J Warmflash
(74) *Attorney, Agent, or Firm* — Treyz Law Group, P.C.; Joseph F. Guihan

(57) ABSTRACT

A wireless charging system may include a wireless power receiving device that receives wireless power signals from a wireless power transmitting device. The wireless power receiving device may transmit power feedback information to the wireless power transmitting device. The wireless power transmitting device may use a variable gain coefficient to update an inverter operating characteristic based on the power feedback information.

19 Claims, 7 Drawing Sheets

(56) References Cited

U.S. PATENT DOCUMENTS

| | | | | |
|---|---|---|---|---|
| 2013/0260676 | A1* | 10/2013 | Singh | H02J 50/10<br>307/104 |
| 2014/0028110 | A1* | 1/2014 | Petersen | H02J 50/12<br>307/104 |
| 2016/0246265 | A1* | 8/2016 | An | G05B 1/01 |
| 2018/0062443 | A1* | 3/2018 | Cho | H02M 7/53871 |
| 2018/0102036 | A1* | 4/2018 | Herbst | G16H 50/30 |
| 2018/0123627 | A1* | 5/2018 | Myoung | H02J 3/01 |
| 2019/0067992 | A1* | 2/2019 | Liu | H02J 50/10 |
| 2019/0334360 | A1* | 10/2019 | Colosimo | H02J 50/12 |
| 2020/0227953 | A1* | 7/2020 | Falkenburg | H02J 50/12 |
| 2020/0287413 | A1* | 9/2020 | Peretz | H02J 50/90 |
| 2020/0381947 | A1* | 12/2020 | Bhandarkar | H02J 50/80 |
| 2020/0403456 | A1* | 12/2020 | Louis | H02J 50/80 |
| 2021/0057938 | A1* | 2/2021 | Russell | H01F 38/14 |
| 2022/0006330 | A1* | 1/2022 | AbuKhalaf | H02J 50/10 |
| 2022/0407415 | A1* | 12/2022 | Bean, Jr. | A61K 35/74 |
| 2023/0059432 | A1* | 2/2023 | Shi | H02J 50/80 |
| 2023/0208203 | A1* | 6/2023 | Park | H02J 50/12 |
| 2024/0030749 | A1* | 1/2024 | Lebens | H02J 50/60 |
| 2024/0048002 | A1* | 2/2024 | Lebens | H02J 50/12 |
| 2024/0313826 | A1* | 9/2024 | Youn | H04B 5/79 |
| 2025/0183732 | A1* | 6/2025 | AbuKhalaf | H02J 50/80 |

FOREIGN PATENT DOCUMENTS

| | | | |
|---|---|---|---|
| JP | 2017060335 | A | 3/2017 |
| JP | 2018113849 | A | 7/2018 |
| JP | 2020511102 | A | 4/2020 |
| JP | 2021002995 | A | 1/2021 |
| JP | 2024525586 | A | 7/2024 |
| KR | 20180102036 | A | 9/2018 |
| KR | 102036636 | B1 | 10/2019 |
| KR | 102048989 | B1 | 11/2019 |
| KR | 102058367 | B1 | 12/2019 |
| KR | 102561180 | B1 | 7/2023 |
| WO | 2023282548 | A1 | 1/2023 |

* cited by examiner $$XCEV = 128 \times \frac{V_{rect\_target} - V_{rect}}{V_{rect\_target}}$$

FIG. 6A $$XCEV = 128 \times \frac{V_{rect\_target} - V_{rect}}{V_{rect}}$$

FIG. 6B $$Vin\_gain = \frac{V_{in} \sin\left(\frac{\pi - \theta}{2}\right)}{128} \; g_{target}$$

FIG. 7

$$Phase\_gain = -2 \frac{Vin\_gain}{VIN\_MIN \cdot \left(\cos\left(\frac{\pi - \theta}{2}\right)\right)} \cdot \frac{180}{\pi}$$

FIG. 8

WIRELESS POWER TRANSFER CONTROL LOOP WITH VARIABLE GAIN COEFFICIENTS

This application claims the benefit of U.S. provisional patent application No. 63/709,899, filed Oct. 21, 2024, and U.S. provisional patent application No. 63/571,480, filed Mar. 29, 2024, which are hereby incorporated by reference herein in their entireties.

FIELD

This relates generally to power systems and, more particularly, to wireless power systems for charging electronic devices.

BACKGROUND

In a wireless charging system, a wireless power transmitting device transmits wireless power to a wireless power receiving device. The wireless power receiving device charges a battery and/or powers components using the wireless power. The wireless power receiving device may provide feedback to the wireless power transmitting device to control wireless power transfer operations.

SUMMARY

An electronic device may be configured to transfer wireless power with an additional electronic device. The electronic device may include a wireless power transfer coil, an inverter configured to supply alternating-current drive signals to the wireless power transfer coil, and control circuitry configured to receive information from the additional electronic device that includes power feedback information and adjust at least one operating characteristic of the inverter using a variable gain coefficient and the power feedback information.

An electronic device may be configured to receive wireless power from an additional electronic device. The electronic device may include a wireless power transfer coil, a rectifier connected to the wireless power transfer coil that has a target output voltage and an actual output voltage, and control circuitry configured to determine a value proportional to a difference between the target output voltage and the actual voltage divided by the actual output voltage, transmit the value to the additional electronic device, and transmit a constant between 0 and 1 to the additional electronic device. The constant may influence a magnitude of a change in wireless power output, responsive to the transmitted value, by the additional electronic device.

BRIEF DESCRIPTION OF THE DRAWINGS

FIG. 6A is an illustrative equation for a power feedback value with a target rectifier output voltage in the denominator in accordance with some embodiments.

FIG. 6B is an illustrative equation for a power feedback value with an actual rectifier output voltage in the denominator in accordance with some embodiments.

FIG. 7 is an illustrative equation for a variable gain coefficient used to determine a voltage step in accordance with some embodiments.

FIG. 8 is an illustrative equation for a variable gain coefficient used to determine a phase step in accordance with some embodiments.

DETAILED DESCRIPTION

Figure 1:
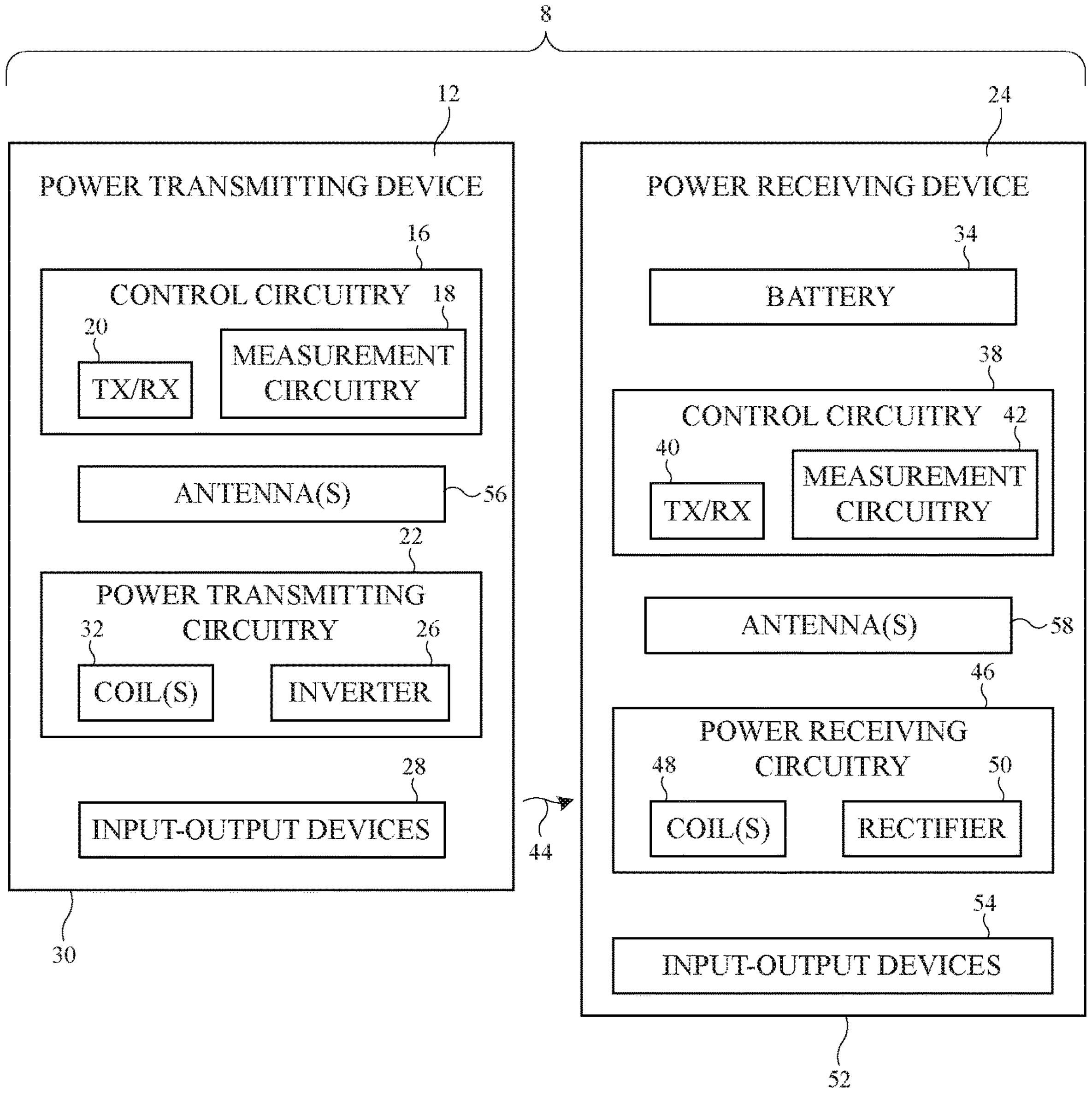
FIG. 1 is a schematic diagram of an illustrative wireless power system in accordance with some embodiments.

An illustrative wireless power system (also sometimes called a wireless charging system) is shown in FIG. 1. As shown in FIG. 1, wireless power system 8 may include one or more wireless power transmitting devices such as wireless power transmitting device 12 and one or more wireless power receiving devices such as wireless power receiving device 24. Wireless power system 8 may sometimes also be referred to herein as wireless power transfer (WPT) system 8 or wireless power system 8. Wireless power transmitting device 12 may sometimes also be referred to herein as power transmitter (PTX) device 12 or simply as PTX 12. Wireless power receiving device 24 may sometimes also be referred to herein as power receiver (PRX) device 24 or simply as PRX 24.

PTX device 12 includes control circuitry 16. Control circuitry 16 is mounted within housing 30. PRX device 24 includes control circuitry 38 mounted within a corresponding housing 52 for PRX device 24. Exemplary control circuitry 16 and control circuitry 38 are used in controlling the operation of WPT system 8. This control circuitry may include processing circuitry that includes one or more processors such as microprocessors, power management units, baseband processors, digital signal processors, microcontrollers, graphics processing units (GPUs), central processing units (CPUs), application processors (APs), application-specific integrated circuits with processing circuits, and/or other processing circuits. The processing circuitry implements desired control and communications features in PTX device 12 and PRX device 24. For example, the processing circuitry may be used in controlling power to one or more coils, determining and/or setting power transmission levels, generating and/or processing sensor data (e.g., to detect foreign objects and/or external electromagnetic signals or fields), processing user input, handling negotiations between PTX device 12 and PRX device 24, sending and receiving in-band and out-of-band data, making measurements, and/or otherwise controlling the operation of WPT system 8.

Control circuitry in WPT system 8 (e.g., control circuitry 16 and/or 38) is configured to perform operations in WPT system 8 using hardware (e.g., dedicated hardware or circuitry), firmware and/or software. Software code for performing operations in WPT system 8 is stored on non-transitory computer readable storage media (e.g., tangible computer readable storage media) in the control circuitry of WPT system 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 38.

PTX device 12 may be a stand-alone power adapter (e.g., a wireless charging mat or charging puck that includes power adapter circuitry), may be a wireless charging mat or puck that is connected to a power adapter or other equipment by a cable, may be an electronic device (e.g., a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a television, a computer display that does not contain an embedded computer, a gaming device, a navigation device, a wireless internet-connected voice-controlled speaker, a home entertainment device, a remote control device, a gaming controller, a peripheral user input device, a wireless base station or access point, equipment that implements the functionality of two or more of these devices, or other electronic equipment), may be equipment that has been incorporated into furniture, a vehicle, or other system, may be a removable battery case, or may be other wireless power transfer equipment.

PRX device 24 may be an electronic device such as a laptop computer, a desktop computer, a computer monitor containing an embedded computer, a tablet computer, a cellular telephone, a media player, or other handheld or portable electronic device, a smaller device such as a wristwatch device, a pendant device, a headphone or earpiece device, a device embedded in eyeglasses, goggles, or other equipment worn on a user's head, or other wearable or miniature device, a wireless tracking tag, a television, a computer display that does not contain an embedded computer, a gaming device, a navigation device, a wireless internet-connected voice-controlled speaker, a home entertainment device, a remote control device, a gaming controller, a peripheral user input device, a wireless base station or access point, equipment that implements the functionality of two or more of these devices, or other electronic equipment.

PTX device 12 may be connected to a wall outlet (e.g., an alternating current power source), may be coupled to a wall outlet via an external power adapter, may have a battery for supplying power, and/or may have another source of power. In implementations where PTX device 12 is coupled to a wall outlet via an external power adapter, the adapter may have an alternating-current (AC) to direct-current (DC) power converter that converts AC power from a wall outlet or other power source into DC power. If desired, PTX device 12 may include a DC-DC power converter for converting the DC power between different DC voltages. Additionally or alternatively, PTX device 12 may include an AC-DC power converter that generates the DC power from the AC power provided by the wall outlet (e.g., in implementations where PTX device 12 is connected to the wall outlet without an external power adapter). DC power may be used to power control circuitry 16. During operation, a controller in control circuitry 16 uses power transmitting circuitry 22 to transmit wireless power to power receiving circuitry 46 of PRX device 24.

Power transmitting circuitry 22 may have switching circuitry, such as inverter circuitry 26 formed from transistors, that are turned on and off based on control signals provided by control circuitry 16 to create AC current signals through one or more wireless power transmitting coils such as wireless power transmitting coil(s) 32. These coil drive signals cause coil(s) 32 to transmit wireless power. In implementations where coil(s) 32 include multiple coils, the coils may be disposed on a ferromagnetic structure, arranged in a planar coil array, or may be arranged to form a cluster of coils (e.g., two or more coils, 5-10 coils, at least 10 coils, 10-30 coils, fewer than 35 coils, fewer than 25 coils, or other suitable number of coils). In some implementations, PTX device 12 includes only a single coil 32.

As the AC currents pass through one or more coils 32, alternating-current electromagnetic (e.g., magnetic) fields (wireless power signals 44) are produced that are received by one or more corresponding receiver coils such as coil(s) 48 in PRX device 24. In other words, one or more of coils 32 is inductively coupled to one or more of coils 48. PRX device 24 may have a single coil 48, at least two coils 48, at least three coils 48, at least four coils 48, or another suitable number of coils 48. When the alternating-current electromagnetic fields are received by coil(s) 48, corresponding alternating-current currents are induced in coil(s) 48. The AC signals that are used in transmitting wireless power may have any desired frequency (e.g., 100-400 kHz, 1-100 MHz, between 1.7 MHz and 1.8 MHz, less than 2 MHz, between 100 kHz and 2 MHz, between 13 and 14 MHz, etc.). Rectifier circuitry such as rectifier circuitry 50, which contains rectifying components such as synchronous rectification transistors arranged in a bridge network, converts received AC signals (received alternating-current signals associated with wireless power signals 44) from one or more coils 48 into DC voltage signals for powering PRX device 24. Wireless power signals 44 are sometimes referred to herein as wireless power 44 or wireless charging signals 44. Coils 32 are sometimes referred to herein as wireless power transfer coils 32, wireless charging coils 32, or wireless power transmitting coils 32. Coils 48 are sometimes referred to herein as wireless power transfer coils 48, wireless charging coils 48, or wireless power receiving coils 48.

The DC voltage produced by rectifier circuitry 50 (sometime referred to as rectifier output voltage Vrect) may be used in charging a battery such as battery 34 and may be used in powering other components in PRX device 24 such as control circuitry 38, input-output (I/O) devices 54, etc. PTX device 12 may also include input-output devices such as input-output devices 28. Input-output devices 54 and/or input-output devices 28 may include input devices for gathering user input and/or making environmental measurements and may include output devices for providing a user with output.

As examples, input-output devices 28 and/or input-output devices 54 may include a display (screen) for creating visual output, a speaker for presenting output as audio signals, light-emitting diode status indicator lights and other light-emitting components for emitting light that provides a user with status information and/or other information, haptic devices for generating vibrations and other haptic output, and/or other output devices. Input-output devices 28 and/or input-output devices 54 may also include sensors for gathering input from a user and/or for making measurements of the surroundings of WPT system 8.

The example in FIG. 1 of PRX device 24 including battery 34 is illustrative. More generally, an electronic device may include a power storage device 34. Power storage device 34 may be a battery, or may be, for example, a supercapacitor that stores charge.

PTX device 12 and PRX device 24 may communicate wirelessly using in-band or out-of-band communications. Implementations using in-band communication may utilize, for example, frequency-shift keying (FSK) and/or amplitude-shift keying (ASK) techniques to communicate in-band data between PTX device 12 and PRX device 24. Wireless power and in-band data transmissions may be conveyed using coils 32 and 48 concurrently. When PTX 12 sends in-band data to PRX 24, wireless transceiver (TX/RX) circuitry 20 may modulate wireless charging signal 44 to impart FSK or ASK communications, and wireless transceiver circuitry 40 may demodulate the wireless charging signal 44 to obtain the data that is being communicated. When PRX 24 sends in-band data to PTX 12, wireless transceiver (TX/RX) circuitry 40 may modulate wireless charging signal 44 to impart FSK or ASK communications, and wireless transceiver circuitry 20 may demodulate the wireless charging signal 44 to obtain the data that is being communicated.

Implementations using out-of-band communication may utilize, for example, hardware antenna structures and communication protocols such as Bluetooth or NFC to communicate out-of-band data between PTX device 12 and PRX device 24. Power may be conveyed wirelessly between coils 32 and 48 concurrently with the out-of-band data transmissions. Wireless transceiver circuitry 20 may wirelessly transmit and/or receive out-of-band signals to and/or from PRX device 24 using an antenna such as antenna 56. Wireless transceiver circuitry 40 may wirelessly transmit and/or receive out-of-band signals to and/or from PTX device 12 using an antenna such as antenna 58.

Control circuitry 16 in PTX device 12 has measurement circuitry 18 that may be used to perform measurements of one or more characteristics external to PTX device 12. For example, measurement circuitry 18 may detect external objects on or adjacent the charging surface of the housing of PTX device 12. While shown in FIG. 1 as being separate from power transmitting circuitry 22 for the sake of clarity, measurement circuitry 18 may form a part of power transmitting circuitry 22 if desired.

Measurement circuitry 18 may detect foreign objects such as coils, paper clips, and other metallic objects, may detect the presence of PRX device 24 (e.g., circuitry 18 may detect the presence of one or more coils 48 and/or magnetic core material associated with coils 48), and/or may detect the presence of other power transmitting devices in the vicinity of PTX device 12 and/or WPT system 8. Measurement circuitry 18 may also be used to make sensor measurements using a capacitive sensor, may be used to make temperature measurements, and/or may otherwise be used in gathering information indicative of whether a foreign object, power transmitting device, power receiving device, or other external object (e.g., PRX device 24) is present on or adjacent to the coil(s) 32 of PTX device 12. If desired, PRX device 24 may include measurement circuitry 42. Measurement circuitry 42 may perform one or more of the measurements performed by measurement circuitry 18 (e.g., for or using coil(s) 48 on PRX device 24).

Each one of housing 30 and housing 52 may be formed from plastic, metal, fiber-composite materials such as carbon-fiber materials, wood and other natural materials, glass, other materials, and/or combinations of two or more of these materials.

The example in FIG. 1 of PTX 12 transmitting wireless power and PRX 24 receiving wireless power is merely illustrative. PTX 12 may optionally be capable of receiving wireless power signals using coil(s) 32 and PRX 24 may optionally be capable of transmitting wireless power signals using coil(s) 48. When a device is capable of both transmitting and receiving wireless power signals, the device may include both an inverter and a rectifier.

Figure 2:
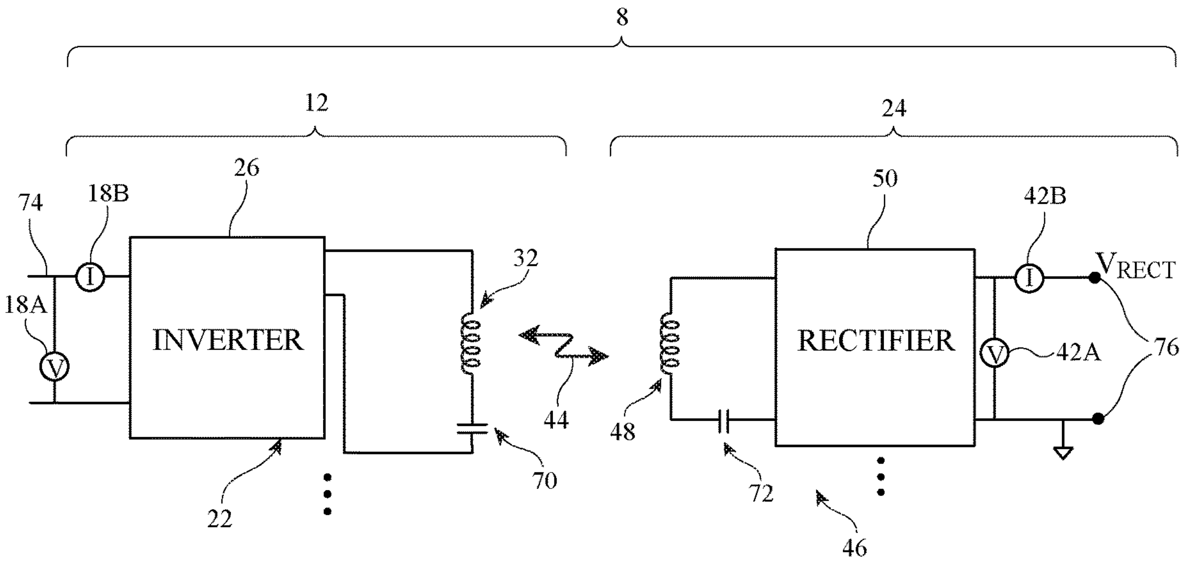
FIG. 2 is a circuit diagram of wireless power transmitting and receiving circuitry in accordance with some embodiments.

FIG. 2 is a circuit diagram of illustrative wireless charging circuitry for system 8. As shown in FIG. 2, circuitry 22 may include inverter circuitry such as one or more inverters 26 or other drive circuitry that produces wireless power signals that are transmitted through an output circuit that includes one or more coils 32 and capacitors such as capacitor 70. In some embodiments, device 12 may include multiple individually controlled inverters 26, each of which supplies drive signals to a respective coil 32. In other embodiments, an inverter 26 is shared between multiple coils 32 using switching circuitry.

During operation, control signals for inverter(s) 26 are provided by control circuitry 16 at one or more control inputs 74. A single inverter 26 and single coil 32 is shown in the example of FIG. 2, but multiple inverters 26 and multiple coils 32 may be used, if desired. In a multiple coil configuration, switching circuitry (e.g., multiplexer circuitry) may be used to couple a single inverter 26 to multiple coils 32 and/or each coil 32 may be coupled to a respective inverter 26. During wireless power transmission operations, transistors in one or more selected inverters 26 are driven by AC control signals from control circuitry 16. The relative phase between the inverters may be adjusted dynamically (e.g., a pair of inverters 26 may produce output signals in phase or out of phase).

The application of drive signals using inverter(s) 26 (e.g., transistors or other switches in circuitry 22) causes the output circuits formed from selected coils 32 and capacitors 70 to produce alternating-current electromagnetic fields (signals 44) that are received by wireless power receiving circuitry 46 using a wireless power receiving circuit formed from one or more coils 48 and one or more capacitors 72 in device 24.

Rectifier circuitry 50 is coupled to one or more coils 48 and converts received power from AC to DC and supplies a corresponding direct current output voltage Vrect across rectifier output terminals 76 for powering load circuitry in device 24 (e.g., for charging battery 34, for powering a display and/or other input-output devices 54, and/or for powering other components).

FIG. 2 shows how measurement circuitry 18 within PTX 12 may include one or more voltage sensors such as voltage sensor 18A and one or more current sensors such as current sensor 18B. Additionally, measurement circuitry 42 within PRX 24 may include one or more voltage sensors such as voltage sensor 42A and one or more current sensors such as current sensor 42B. The voltage and current sensors within system 8 may be used to determine power levels within the system.

The specific locations of sensors 18A, 18B, 42A, and 42B (on the DC sides of inverter 26 and rectifier 50 respectively) in FIG. 2 are merely illustrative. In general, voltage and current sensors may be positioned at any desired positions within the power transmitting circuitry 22 and the power receiving circuitry 46 (e.g., on the AC sides of inverter 26 and rectifier 50 if desired).

Figure 3:
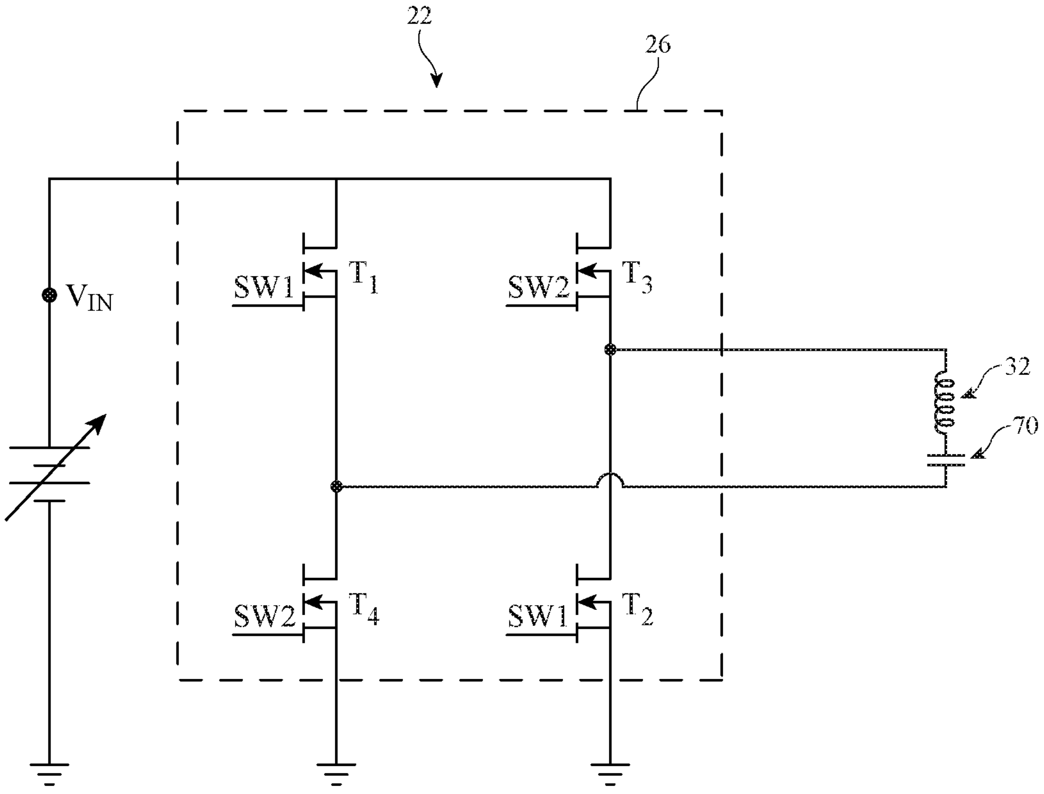
FIG. 3 is a circuit diagram of illustrative wireless power transmitting circuitry with an inverter in accordance with some embodiments.

FIG. 3 is a circuit diagram showing an arrangement for inverter 26 in power transmitting circuitry 22. As shown in FIG. 3, inverter 26 may be a full-bridge inverter that includes four switches arranged in a bridge configuration. Switches $T_1$ and $T_4$ are connected in series between a control terminal that provides an adjustable voltage $V_{IN}$ and ground. In parallel to switches $T_1$ and $T_4$, switches $T_3$ and $T_2$ are connected in series between the control terminal that provides adjustable voltage $V_{IN}$ and ground. Coil 32 and capacitor 70 are connected between a first node between $T_1$ and $T_4$ and a second node between $T_2$ and $T_3$. The four switches ($T_1$, $T_2$, $T_3$, and $T_4$) may be power metal-oxide-semiconductor field-effect transistors (MOSFETs), insulated-gate bipolar transistors (IGBTs), or other desired switching components. FIG. 3 shows an example where switches $T_1$, $T_2$, $T_3$, and $T_4$ (sometimes referred to as transistors $T_1$, $T_2$, $T_3$, and $T_4$) are power MOSFETs.

During operation of inverter 26, transistors $T_1$, $T_2$, $T_3$, and $T_4$ may be switched on and off in pairs. During one half-cycle of the output waveform, one pair of transistors (e.g., transistors $T_1$ and $T_2$) conducts (is turned on) while the other pair is turned off. Then, during the next half-cycle, the conducting transistors ($T_1$ and $T_2$) are switched off, and the previously turned-off transistors ($T_3$ and $T_4$) are turned on. This process is repeated to generate the desired AC output waveform as input to wireless power transfer coil 32.

FIG. 3 shows an example where transistors $T_1$ and $T_2$ receive a common control signal SW1 and transistors $T_3$ and $T_4$ receive a common control signal SW2. Control signals SW1 and SW2 may be alternatively switched between first and second states (e.g., high and low states) to operate inverter 26.

There are several operating characteristics of inverter 26 that may be adjusted during operation of PTX 12. These operating characteristics include an inverter voltage $V_{IN}$, an operating phase θ, a duty cycle, and a frequency of the output AC current signals generated by inverter 26.

As shown in FIG. 3, inverter 26 may be connected to a variable DC voltage $V_{IN}$. The magnitude of $V_{IN}$ may be adjusted to control a magnitude of wireless power transmitted by power transmission circuitry 22. Increasing $V_{IN}$ causes an increase in the magnitude of wireless power transmitted by power transmission circuitry 22 whereas decreasing $V_{IN}$ causes a decrease in the magnitude of wireless power transmitted by power transmission circuitry 22.

Figure 4A:
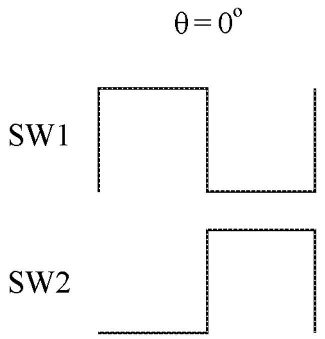
FIGS. 4A and 4B are illustrative timing diagrams for inverter control signals when the inverter has different operating phases in accordance with some embodiments.
Figure 4B:
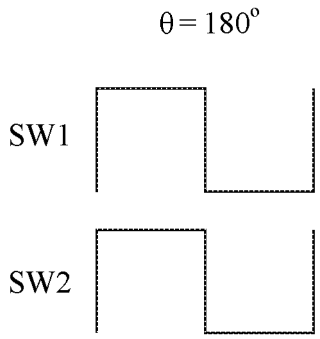

Inverter 26 may also have an associated operating phase. The operating phase θ (sometimes referred to as inverter phase θ) may refer to the offset between control signals SW1 and SW2. FIG. 4A shows a timing diagram for SW1 and SW2 when the inverter phase is equal to 0 degrees. FIG. 4B shows a timing diagram for SW1 and SW2 when the inverter phase is equal to 180 degrees. Using the convention of FIGS. 4A and 4B, an operating phase of 0 (zero) degrees is defined as the condition during which SW2 is the inverse of SW1 and an operating phase of 0 degrees is defined as the condition during which SW2 is the same as SW1. At an operating phase of 0 degrees SW2 changes from low to high when SW1 changes from high to low and SW2 changes from high to low when SW1 changes from low to high. In other words, the waveforms of SW1 and SW2 are offset by half a period when the operating phase is 0 degrees. At an operating phase of 180 degrees SW2 changes from low to high when SW1 changes from low to high and SW2 changes from high to low when SW1 changes from high to low. In other words, the waveforms of SW1 and SW2 are synchronous when the operating phase is 180 degrees.

With the definition of operating phase θ in FIGS. 4A and 4B, the effective output voltage of the inverter is maximized when the phase is equal to 0 degrees (as shown in FIG. 4A) and minimized when the phase is equal to 180 degrees (as shown in FIG. 4B). Adjusting the phase of inverter 26 may therefore adjust a magnitude of wireless power transmitted by power transmission circuitry 22. Between 0 degrees and 180 degrees, increasing the phase causes a decrease in the magnitude of wireless power transmitted by power transmission circuitry and decreasing the phase causes an increase in the magnitude of wireless power transmitted by power transmission circuitry 22.

In some arrangements, inverter 26 may operate with a fixed duty cycle (e.g., a fixed duty cycle of 50%). The fixed duty cycle may refer to the duty cycle of control signals SW1 and SW2. FIGS. 4A and 4B show an example where SW1 and SW2 have a fixed duty cycle of 50%. In other arrangements, inverter 26 may operate with an adjustable duty cycle and may adjust the duty cycle to increase or decrease the magnitude of wireless power transmitted by power transmission circuitry 22.

Inverter 26 may be operable at different wireless power transfer signal frequencies. PTX device 12 may use different wireless power transfer signal frequencies for different PRX devices, as one example. In some arrangements, the wireless power transfer signal frequency may not be adjusted to adjust the magnitude of wireless power transmitted by power transmission circuitry 22. In these arrangements, the wireless power transfer signal frequency is fixed during a power transfer phase and the inverter voltage and phase are adjusted to adjust the magnitude of wireless power transmitted by power transmission circuitry 22. In other arrangements, the wireless power transfer signal frequency may be adjusted to adjust the magnitude of wireless power transmitted by power transmission circuitry 22.

To control the amount of power transferred from PTX device 12 to PRX device 24, a power delivery control system may be used where PRX device 24 reports power feedback information to PTX device 12. Based on the power feedback information, PTX device 12 may adjust an operating characteristic of inverter 26 (e.g., inverter voltage and/or phase) to adjust the amount of power that is being transferred from PTX device 12 to PRX device 24. PRX device 24 may then again report power feedback information to PTX device 12 and the cycle repeats. Examples of power feedback information include the control error packet (CEP) and extended control error packet (XCE) in the Qi standard as specified by the Wireless Power Consortium organization.

Figure 5:
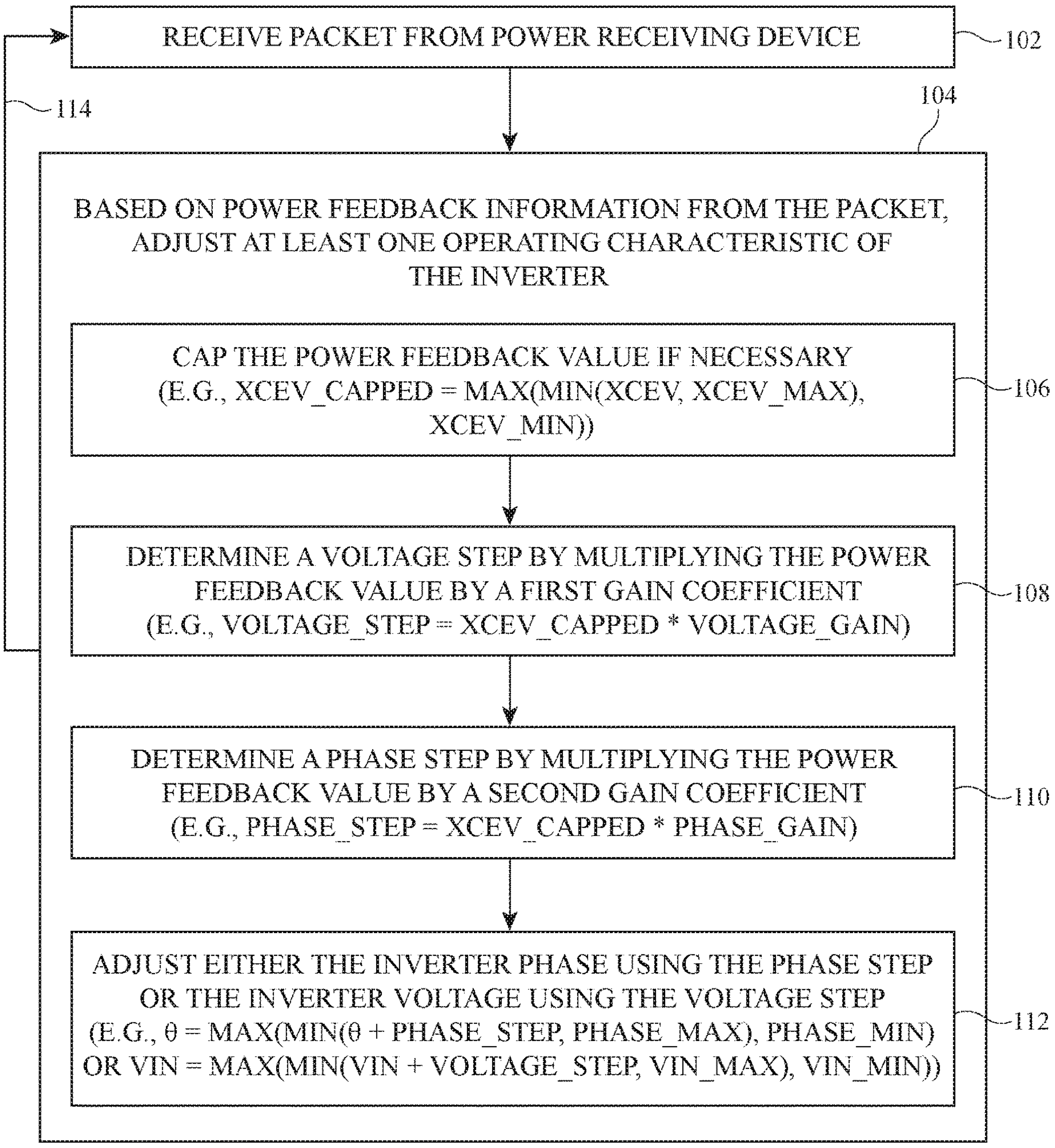
FIG. 5 is a flowchart of an illustrative method of operating a wireless power transmitting device during power control operations in accordance with some embodiments.

FIG. 5 is a flowchart showing an illustrative method performed by PTX device 12 to adjust a magnitude of power transfer based on received power feedback information. First, during the operations of block 102, PTX device 12 may receive a packet from PRX 24. PTX device 12 may receive the packet from PRX 24 using in-band communication (e.g., using FSK or ASK). In some use cases this packet is a CEP or XCE packet that includes power feedback information.

As previously described in connection with FIG. 2, PRX device 24 has a rectifier output voltage $V_{RECT}$. The rectifier output voltage may sometimes be referred to as an actual rectifier output voltage $V_{RECT}$. PRX device 24 may also have a target rectifier output voltage $V_{RECT\_TARGET}$. The goal of the feedback loop of FIG. 5 is to increase or decrease the power delivered by PTX 12 to PRX 24 so that the actual rectifier output voltage reaches the target rectifier output voltage. It is also beneficial to have this power control occur quickly while maintaining stable operation. During wireless power transfer, PRX 24 may compare the actual rectifier output voltage to the target rectifier output voltage. When there is a difference between the actual rectifier output voltage and the target rectifier output voltage, PRX 24 may transmit, using a power feedback information packet, a value that is proportional to the difference between the actual rectifier output voltage and the target rectifier output voltage. In the case of the above-described XCE packet, this value is provided in the XCE value (XCEV) field of the packet.

The actual rectifier output voltage may be determined using a voltage sensor such as voltage sensor 42A from FIG. 2. The voltage sensor may include a calibrated ADC that samples the rectifier output voltage every 10 milliseconds (or at another desired sampling frequency). The magnitude of $V_{RECT}$ may be determined by averaging the output from the voltage sensor over multiple recent samples.

XCEV may be proportional to the difference between the actual rectifier output voltage and the target rectifier output voltage (e.g., $V_{RECT\_TARGET}-V_{RECT}$). FIGS. 6A and 6B are illustrative equations that may be used to determine the magnitude of the extended control error value (XCEV). In both the equations of FIGS. 6A and 6B, XCEV is the extended control error value that is included in the packet received during the operation of block 102, $V_{RECT}$ is the actual rectifier output voltage, and $V_{RECT\_TARGET}$ is the target rectifier output voltage (as previously discussed). In FIG. 6A, the error term ($V_{RECT\_TARGET}-V_{RECT}$) is divided by $V_{RECT\_TARGET}$. In FIG. 6B, the error term ($V_{RECT\_TARGET}-V_{RECT}$) is divided by $V_{RECT}$. Using the equation of FIG. 6B for XCEV may be advantageous when PTX 12 operates in a gain linearization mode, as will be discussed later in greater detail.

It is noted that the XCEV equations of FIGS. 6A and 6B may optionally be subject to a floor function that outputs the greatest integer that is less than or equal to the result of the equation. When a floor function is used, an additional term of "+½" may be included in the XCEV equation.

After receiving the packet from PRX 24 during the operations of block 102, PTX 12 may, during the operations of block 104, adjust at least one operating characteristic of inverter 26 based on the power feedback information from the packet from block 102. In particular, PTX 12 may obtain the XCEV from the packet and adjust (e.g., increase or decrease) either the inverter voltage or the inverter phase using the XCEV.

There are many possible control schemes that may be applied by PTX 12 to adjust an operating characteristic of inverter 26 based on the received XCEV. FIG. 5 shows one example of a control scheme in the operations of blocks 106, 108, 110, and 112.

During the operations of block 106, the XCEV may be capped to ensure that the XCEV is no greater than a maximum allowable XCEV (XCEV_MAX) and no less than a minimum allowable XCEV (XCEV_MIN). When the received XCEV is greater than the maximum allowable XCEV, the XCEV may be set equal to the maximum allowable XCEV. When the received XCEV is less than the minimum allowable XCEV, the XCEV may be set equal to the minimum allowable XCEV. Written in an equation: XCEV_capped=max(min(XCEV, XCEV_MAX), XCEV_MIN).

After the XCEV has been capped during the operations of block 106, a voltage step may be determined during the operations of block 108 and a phase step may be determined during the operations of block 110. The voltage step in block 108 may be an adjustment to the current inverter voltage that is determined by multiplying XCEV by a first gain coefficient (e.g., Voltage_step=XCEV_capped*Voltage_gain, where Voltage_gain is the first gain coefficient). The phase step in block 110 may be an adjustment to the current inverter phase that is determined by multiplying XCEV by a second gain coefficient (e.g., Phase_step=XCEV_capped*Phase_gain, where Phase_gain is the second gain coefficient).

Next, during the operations of block 112, control circuitry 16 may adjust the inverter voltage using the voltage step from block 108 and/or or the inverter phase using the phase step from block 110. In some control schemes, inverter phase and voltage may both be updated during the operations of block 112. Alternatively, in an illustrative control scheme that is discussed here as an example, only one of the phase and voltage may be adjusted at a time during the operations of block 112. There are multiple ways to prioritize adjustments to the inverter phase compared to adjustments to the inverter voltage. The inverter phase may have a minimum (PHASE_MIN) and maximum (PHASE_MAX) and the inverter voltage may have a minimum (VIN_MIN) and maximum (VIN_MAX). In one illustrative control scheme, a priority is placed on having the inverter phase be at a minimum (with an associated maximum possible power delivery) over the inverter voltage being at a maximum (with an associated maximum possible power delivery).

Consider a scenario where $V_{RECT}$ is less than $V_{RECT\_TARGET}$. In this scenario, XCEV is greater than 0, indicating that PRX 24 is requesting an increase in power from PTX 12. When XCEV is greater than 0 and the inverter phase is not equal to PHASE_MIN, the inverter phase may be adjusted according to the formula θ=θ+Phase_step (and the inverter voltage is not adjusted). When XCEV is greater than 0 and the inverter phase is equal to PHASE_MIN, the inverter voltage may be adjusted according to the formula $V_{IN}=V_{IN}$+Voltage_step (and the inverter phase is not adjusted).

Consider a scenario where $V_{RECT}$ is greater than $V_{RECT\_TARGET}$. In this scenario, XCEV is less than 0, indicating that PRX 24 is requesting a decrease in power from PTX 12. When XCEV is less than 0 and the inverter voltage is not equal to VIN_MIN, the inverter voltage may be adjusted according to the formula $V_{IN}=V_{IN}$+Voltage_step (and the inverter phase is not adjusted). When XCEV is less than 0 and the inverter voltage is equal to VIN_MIN, the inverter phase may be adjusted according to the formula θ=θ+Phase_step (and the inverter voltage is not adjusted).

When the calculated inverter phase is greater than PHASE_MAX, the inverter phase may be set equal to PHASE_MAX. When the calculated inverter phase is less than PHASE_MIN, the inverter phase may be set equal to PHASE_MIN. Written in an equation: θ=max(min(θ+Phase_step, PHASE_MAX), PHASE_MIN).

When the calculated inverter voltage is greater than VIN_MAX, the inverter voltage may be set equal to VIN_MAX. When the calculated inverter voltage is less than VIN_MIN, the inverter phase may be set equal to VIN_MIN. Written in an equation: VIN=max(min(VIN+Voltage_step, VIN_MAX), VIN_MIN).

As illustrative examples, XCEV_MAX may be equal to 64, XCEV_MIN may be equal to −64, PHASE_MIN may be equal to 0 degrees, PHASE_MAX may be equal to 50 degrees, $V_{IN}$_MIN may be 6.5 V, 10 V, 16 V, between 6 V and 18 V, less than 17 V, between 8 V and 18 V, etc., and VIN_MAX may be 18 V, 20 V, between 17 V and 22 V, less than 21 V, etc.

Therefore, during the operations of FIG. 5, the magnitude of the adjustment to the inverter phase or the inverter voltage is dependent on the magnitude of XCEV and the magnitude of the corresponding gain coefficient.

In a first mode of operation, sometimes referred to as a constant gain mode, the gain coefficients may be constants. As an example, Phase_gain may be equal to −0.16 degrees in the aforementioned equation Phase_step=XCEV_capped*Phase_gain and Voltage_gain may be equal to 0.16 mV in the aforementioned equation Voltage_step=XCEV_capped*Voltage_gain.

Using constant values for the gain coefficients Phase_gain and Voltage_gain may be a satisfactory technique for adjusting the phase and voltage during power transfer control. However, the magnitudes of the constants may need to be sufficiently conservative to ensure stability in a wide range of operating conditions. Having conservative, constant gain coefficients causes the control loop to be slower than desired in certain operation conditions. Said another way, the magnitudes of the gain coefficients control the speed of the ramp up (or ramp down) during power delivery adjustments. The constant gain coefficients may result in a slower ramp up (or ramp down) than desired during some operating conditions.

Some of the causes of slow ramp up (or ramp down) when constant gain coefficients are used are circuit gain diminishing when phase ramps (causing a varying effective drive over time during phase ramp), a large variation of circuit gain from $V_{IN}$ to $V_{RECT}$ (which may be caused by different positional offset between PTX device 12 and PRX device 24 and/or varying load conditions on PRX device 24), and large variation of designs for PTX device 12 and PRX 24. The constant gain coefficients must be selected to accommodate the factors listed above, causing overly conservative ramp up (or ramp down) in many operating conditions.

To improve the speed of ramp up (or ramp down) in a wide range of operation conditions, PTX 12 may be operable in a second mode (sometimes referred to as a gain linearization mode) in which the gain coefficients are variable and compensate for the circuit gain. Use of variable gain coefficients (sometimes referred to as dynamic gain coefficients) in the second mode may improve the speed with which $V_{RECT}$ matches $V_{RECT\_TARGET}$ compared to the first mode when constant gain coefficients are used.

FIGS. 7 and 8 show formulas for the variable gain coefficients. FIG. 7 is an equation for the variable gain coefficient used to determine a voltage step during the operations of block 108. In the equation of FIG. 7, $V_{IN}$_gain is the variable gain coefficient, $V_{IN}$ is the inverter voltage, θ is the inverter phase, and $g_{target}$ is a value between 0 and 1. The magnitude of $g_{target}$ may be selected by PTX 12 or PRX 24 and may set the power convergence speed and stability. A higher magnitude of $g_{target}$ causes a more aggressive (e.g., faster) ramp up (or ramp down) in power delivery whereas a lower magnitude of $g_{target}$ causes a less aggressive (e.g., slower) ramp up (or ramp down) in power delivery. In general, it may be desirable to select a magnitude for $g_{target}$ that is as high as possible (to maximize the convergence speed) while ensuring stability within the system. Selecting a magnitude of $g_{target}$ that is less than 1 may help stabilize the system.

In some cases, the magnitude of $g_{target}$ may be fixed. For example, PTX 12 may use a magnitude of 0.5 for $g_{target}$ regardless of the operating conditions. In another possible example, PTX 12 may change $g_{target}$ based on one or more factors such as the device type of PRX 24 (e.g., whether the PRX is a cellular telephone, watch, or other type of device), a state of charge of a battery in PRX 24 (as reported by PRX 24 to PTX 12), etc. In yet another possible example, PRX 24 may change $g_{target}$ based on one or more factors such as the device type of PTX 12 (e.g., whether the PTX is a stand-alone power adapter, a wireless charging mat or puck that is connected to a power adapter or other equipment by a cable, a cellular telephone, or other type of device), a state of charge of battery 34 in PRX 24, etc.

In another possible arrangement, PRX 24 may change $g_{target}$ based on a most recent change in $V_{RECT}$ caused by a loop iteration of the operations of FIG. 5. After each loop iteration (e.g., each repeated cycle of the operations of FIG. 5), PRX 24 may calculate a change in $V_{RECT}$ (e.g., $V_{RECT}$ CHANGE) from before and after PTX adjusts an operating characteristic per the operations of block 104 in FIG. 5. For example, $V_{RECT\_CHANGE}=V_{RECT}'-V_{RECT}$, where $V_{RECT}'$ is the rectifier voltage from before the most recent loop iteration (e.g., from before the operating characteristic is updated at block 104) and $V_{RECT}$ is the rectifier voltage from after the most recent loop iteration (e.g., from after the operating characteristic is updated at block 104). After calculating $V_{RECT}$ CHANGE, PRX 24 may calculate $g_{observed}$, where $g_{observed}=V_{RECT\_CHANGE}/(V_{RECT\_TARGET}-V_{RECT})$. After calculating $g_{observed}$, PRX 24 may compare $g_{observed}$ to a constant G (or more generally a threshold value). The constant G may be less than or equal to 1 (e.g., between 0.8 and 1.0, between 0.9 and 1.0, etc.). When $g_{observed}$ is greater than G, PRX 24 may increase $g_{target}$. When $g_{observed}$ is less than G, PRX 24 may decrease $g_{target}$.

It is noted that the equations of FIGS. 6A, 6B, and 7 include a constant of 128. The magnitude of this constant may be related to the number of bits in XCEV. In this example, XCEV has 8 bits and 128 is used to scale to the 8-bit limit. If XCEV has a different range (e.g., a different number of bits), a constant other than 128 may be used in the equations of FIGS. 6A, 6B, and 7. In general, the value of the constant may be proportional to the bit length of the relevant field in the power feedback data packet.

FIG. 8 is an equation for the variable gain coefficient used to determine a phase step during the operations of block 110. In the equation of FIG. 8, Phase_gain is the variable gain coefficient used to determine a phase step, VIN_gain is the variable gain coefficient calculated using the equation of FIG. 7, VIN_MIN is the minimum inverter voltage, and θ is the inverter phase. It is noted that equation of FIG. 8 may optionally include a small constant (e.g., 0.01) in the denominator to avoid a divide-by-zero error.

The equations of FIGS. 7 and 8 are merely illustrative. In general, VIN_gain may be proportional to $$Vin\sin\left(\frac{(\pi-\theta)}{2}\right)g_{target}$$

and Phase_gain may be proportional to proportional to $$\frac{\text{VIN\_gain}}{\text{VIN\_MIN}\cos\left(\frac{(\pi-\theta)}{2}\right)}.$$

It is noted that using the equation of FIG. 6B for XCEV may simplify the gain linearization operations of PTX 12.

When the equation of FIG. 6B is used for XCEV, the equation for a variable gain coefficient to determine a voltage step is simplified.

The operations of FIG. 5 may be repeated iteratively until $V_{RECT}$ matches $V_{RECT\_TARGET}$, as indicated by feedback loop 114 in FIG. 5.

Figure 9A:
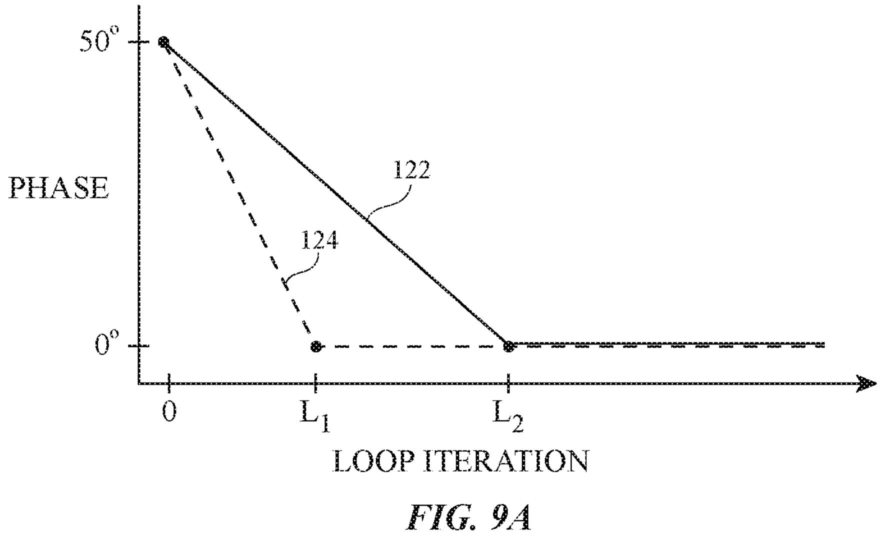
FIG. 9A is an illustrative graph of inverter phase as a function of loop iterations during power ramp up in accordance with some embodiments.
Figure 9B:
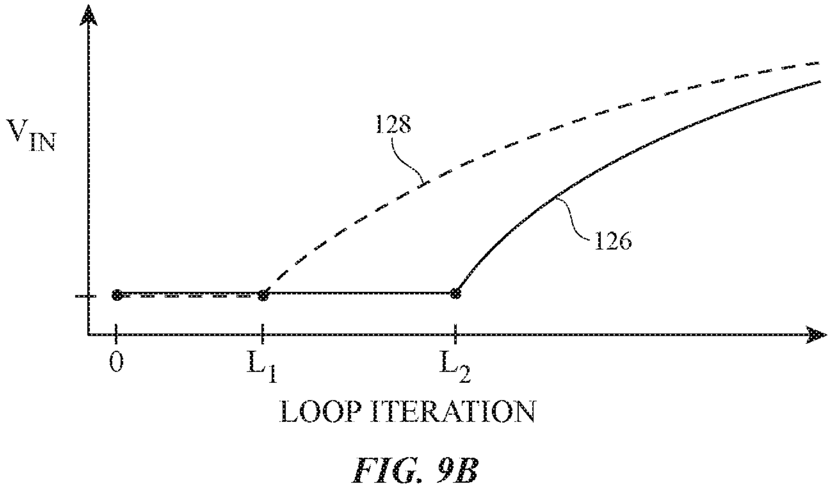
FIG. 9B is an illustrative graph of inverter voltage as a function of loop iterations during power ramp up in accordance with some embodiments.
Figure 9C:
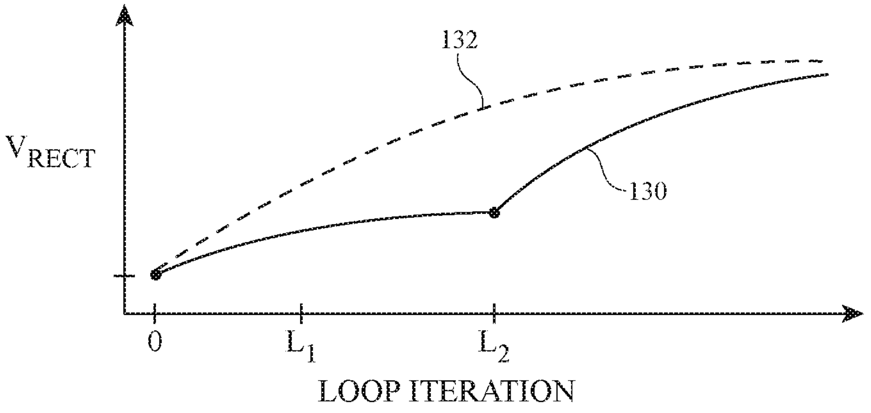
FIG. 9C is an illustrative graph of actual rectifier output voltage as a function of loop iterations during power ramp up in accordance with some embodiments.

FIGS. 9A-9C are graphs showing different parameters during power transfer operations between PTX 12 and PRX 24. FIG. 9A shows the inverter phase over multiple loop iterations (e.g., multiple inverter adjustments as shown by the feedback loop in FIG. 5), FIG. 9B shows the inverter voltage over multiple loop iterations, and FIG. 9C shows the actual rectifier output voltage over multiple loop iterations. FIG. 9A shows a first profile 122 for the inverter phase when PTX 12 operates in a constant gain mode using constant gain coefficients and a second profile 124 for the inverter phase when PTX 12 operates in gain linearization mode using variable gain coefficients. FIG. 9B shows a first profile 126 for the inverter voltage when PTX 12 operates in a constant gain mode using constant gain coefficients and a second profile 128 for the inverter voltage when PTX 12 operates in gain linearization mode using variable gain coefficients. FIG. 9C shows a first profile 130 for the actual rectifier output voltage when PTX 12 operates in a constant gain mode using constant gain coefficients and a second profile 132 for the actual rectifier output voltage when PTX 12 operates in gain linearization mode using variable gain coefficients.

In the scenario of FIGS. 9A-9C, at time 0 the actual rectifier output voltage may be less than the target rectifier output voltage. Therefore, PTX 12 needs to ramp up power delivery to cause the actual rectifier output voltage to match the target rectifier output voltage. As shown in FIG. 9A, in both profiles the phase ramps down over time from PHASE_MAX (e.g., 50 degrees, where power transfer is lowest) to PHASE_MIN (e.g., 0 degrees, where power transfer is greatest). However, the phase ramps down more quickly in profile 124 when PTX 12 operates in the gain linearization mode.

As shown in FIG. 9B, for both profiles the inverter voltage begins to ramp up once the phase reaches 0 degrees. In profile 126, the inverter voltage begins to ramp up at loop iteration $L_2$ when the phase reaches 0 degrees. In profile 128, the inverter voltage begins to ramp up at loop iteration $L_1$ when the phase reaches 0 degrees. The inverter voltage therefore begins to ramp up earlier in profile 128 than in profile 126. The inverter voltage may also ramp up faster in profile 128 than in profile 126.

As shown in FIG. 9C, for both profiles the actual rectifier output voltage ramps up over time. In profile 130, the actual rectifier output voltage has a discontinuity at loop iteration $L_2$ when inverter phase adjustments end and inverter voltage adjustments begin. In contrast, in profile 132 the actual rectifier output voltage does not have any discontinuities. Additionally, the actual rectifier output voltage ramps up faster in profile 132 than in profile 130. $V_{RECT}$ may reach a target rectifier output voltage in fewer loop iterations in profile 132 than in profile 130.

Operating PTX 12 in the gain linearization mode therefore may improve the speed of ramp up (or ramp down) in the power control loop and may avoid discontinuities in the actual rectifier output voltage during ramp up (or ramp down). Operating PTX 12 in the gain linearization mode may also unify the ramp up/down speed across different circuit gains (e.g., caused by different positional offsets between PTX 12 and PRX 24 and/or different load conditions in PRX 24).

Figure 10:
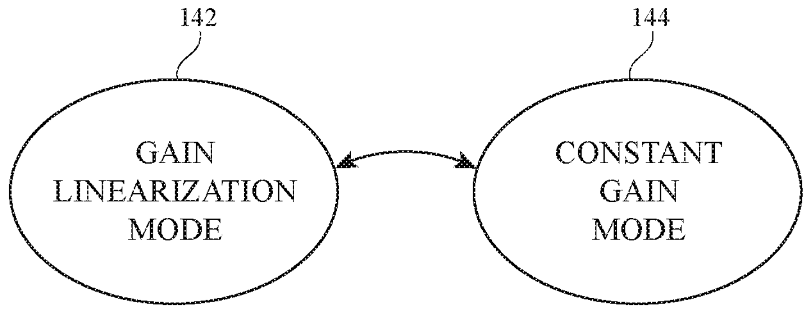
FIG. 10 is a state diagram showing illustrative operating modes for a wireless power transmitting device in accordance with some embodiments.

FIG. 10 is a state diagram showing how PTX 12 may operate in a selected one of a gain linearization mode 142 (sometimes referred to as variable gain coefficient mode 142) and constant gain mode 144 (sometimes referred to as constant gain coefficient mode 144). Control circuitry 16 may place PTX 12 in one of modes 142 and 144 based on one or more factors such as the device type of PRX 24 (e.g., whether the PRX is a cellular telephone, watch, or other type of device), a state of charge of a battery in PRX 24 (as reported by PRX 24 to PTX 12), etc. In yet another possible example, PRX 24 may send instructions to PTX 12 to place PTX 12 in one of modes 142 and 144 based on one or more factors such as the device type of PTX 12 (e.g., whether the PTX is a stand-alone power adapter, a wireless charging mat or puck that is connected to a power adapter or other equipment by a cable, a cellular telephone, or other type of device), a state of charge of battery 34 in PRX 24, etc.

When PRX 24 controls whether PTX 12 operates in mode 142 or mode 144, the mode selection information may be included in the same packet as the XCEV if desired (e.g., a bit in the XCE packet may identify whether PTX 12 should operate in the gain linearization mode 142 or the constant gain mode 144). Alternatively, the mode selection information may be included in a separate packet from the XCEV. The XCE packet with an updated XCEV may be transmitted by PRX 24 with each iteration of the control loop. In contrast, an additional packet with the mode selection information may be transmitted by PRX 24 separately from the XCE packet and only when PRX 24 wishes to change the mode of PTX 12.

Similarly, when PRX 24 selects the magnitude of $g_{target}$ for PTX 12, the magnitude of $g_{target}$ may be included in the same packet as the XCEV if desired (e.g., dedicated bits in the XCE packet may identify a magnitude for $g_{target}$). Alternatively, the magnitude of $g_{target}$ may be included in a separate packet than the XCEV. The XCE packet with an updated XCEV may be transmitted by PRX 24 with each iteration of the control loop. In contrast, an additional packet with the magnitude of $g_{target}$ may be transmitted by PRX 24 separately from the XCE packet and only when PRX 24 wishes to change the magnitude of $g_{target}$.

As an example, PRX 24 may transmit a first packet including mode selection information to PTX 12 during handshake operations with PTX 12 and before a power transfer phase commences. PRX 24 may transmit a second packet including a magnitude of $g_{target}$ to PTX 12 during handshake operations with PTX 12 and before the power transfer phase commences. PRX 24 may then repeatedly transmit XCE packets to PTX 12 during the power transfer phase.

In accordance with an embodiment, a non-transitory computer-readable storage medium may store one or more programs configured to be executed by one or more processors of an electronic device configured to transfer wireless power with an additional electronic device. The electronic device may include a wireless power transfer coil and an inverter configured to supply alternating-current drive signals to the wireless power transfer coil and the one or more programs may include instructions for: receiving information from the additional electronic device, where the information includes power feedback information, and adjusting at least one operating characteristic of the inverter using a variable gain coefficient and the power feedback information.

In accordance with an embodiment, a non-transitory computer-readable storage medium may store one or more programs configured to be executed by one or more processors sors of an electronic device configured to receive wireless power from an additional electronic device. The electronic device may include a wireless power transfer coil and a rectifier connected to the wireless power transfer coil that has a target output voltage and an actual output voltage and the one or more programs including instructions for: determining a first value proportional to a difference between the target output voltage and the actual voltage divided by the actual output voltage, transmitting the first value to the additional electronic device, and transmitting a second value between 0 and 1 to the additional electronic device, where the second value influences a magnitude of a change in wireless power output, responsive to the transmitted first value, by the additional electronic device.

In accordance with an embodiment, a method of operating an electronic device configured to receive wireless power from an additional electronic device, the electronic device comprising a wireless power transfer coil and a rectifier connected to the wireless power transfer coil that has a target output voltage and an actual output voltage may include determining a first value proportional to a difference between the target output voltage and the actual voltage divided by the actual output voltage, transmitting the first value to the additional electronic device, and transmitting a second value between 0 and 1 to the additional electronic device, where the second value influences a magnitude of a change in wireless power output, responsive to the transmitted first value, by the additional electronic device.

The foregoing is merely illustrative and various modifications can be made to the described embodiments. The foregoing embodiments may be implemented individually or in any combination.

What is claimed is:

1. An electronic device configured to transfer wireless power with an additional electronic device, the electronic device comprising:

a wireless power transfer coil;

an inverter configured to supply alternating-current drive signals to the wireless power transfer coil; and control circuitry configured to:

receive information from the additional electronic device, wherein the information includes power feedback information;

determine a variable gain coefficient as a function of at least an inverter voltage, an inverter phase, and a value between 0 and 1; and adjust at least one operating characteristic of the inverter using the variable gain coefficient and the power feedback information.

2. The electronic device of claim 1, wherein adjusting the at least one operating characteristic of the inverter comprises adjusting an input voltage to the inverter and wherein the magnitude of adjustment to the input voltage is determined using the variable gain coefficient and the power feedback information from the additional electronic device.

3. The electronic device of claim 1, wherein adjusting the at least one operating characteristic of the inverter comprises adjusting an operating phase of the inverter and wherein the magnitude of adjustment to the operating phase is determined using the variable gain coefficient and the power feedback information from the additional electronic device.

4. The electronic device of claim 1, wherein adjusting the at least one operating characteristic of the inverter comprises adjusting a selected one of a duty cycle and a wireless power transfer signal frequency and wherein the magnitude of adjustment to the selected one of the duty cycle and the wireless power transfer signal frequency is determined using the variable gain coefficient and the power feedback information from the additional electronic device.

5. The electronic device of claim 1, wherein the control circuitry is further configured to:

adjust the at least one operating characteristic of the inverter using a predetermined gain and the power feedback information, wherein the predetermined gain is predetermined before coupling between the electronic device and additional electronic device.

6. The electronic device of claim 5, wherein the control circuitry is configured to select, based on the information from the additional electronic device, one of the predetermined gain and the variable gain coefficient to adjust the at least one operating characteristic of the inverter.

7. The electronic device of claim 5, wherein the control circuitry is configured to adjust the at least one operating characteristic of the inverter using the predetermined gain in a constant gain mode, wherein the control circuitry is configured to adjust the at least one operating characteristic of the inverter using the variable gain coefficient in a gain linearization mode, wherein the power feedback information comprises a value proportional to a difference between a target rectifier output voltage of the additional electronic device and an actual rectifier output voltage of the additional electronic device, wherein adjusting the at least one operating characteristic of the inverter comprises repeatedly adjusting the at least one operating characteristic of the inverter until the actual rectifier output voltage matches the target rectifier output voltage in the additional electronic device, and wherein the actual rectifier output voltage matches the target rectifier output voltage in the additional electronic device faster in the gain linearization mode than in the constant gain mode.

8. The electronic device of claim 1, wherein the control circuitry is configured to receive the value from the additional electronic device.

9. The electronic device of claim 1, wherein the control circuitry is configured to determine an additional variable gain coefficient as a function of at least the variable gain coefficient, a minimum inverter voltage, and the inverter phase.

10. The electronic device of claim 9, wherein the control circuitry is configured to determine the variable gain coefficient using the equation $$\mathrm{VIN\_gain} = \frac{V_{IN}\sin\left(\frac{(\pi-\theta)}{2}\right)}{n} g_{target},$$

where VIN_gain is the variable gain coefficient, $V_{IN}$ is the inverter voltage, θ is the inverter phase, n is a constant that is proportional to a bit length of the power feedback information, and $g_{target}$ is the value and wherein the control circuitry is configured to determine the additional variable gain coefficient using the equation $$\mathrm{Phase\_gain} = -2\frac{\mathrm{VIN\_gain}}{\mathrm{VIN\_MIN}\cos\left(\frac{(\pi-\theta)}{2}\right)} \times \frac{180}{\pi},$$

where Phase_gain is the additional variable gain coefficient, VIN_gain is the variable gain coefficient, VIN_MIN is the minimum inverter voltage, and θ is the inverter phase.

11. The electronic device of claim 1, wherein the power feedback information comprises a value proportional to a difference between a target rectifier output voltage of the additional electronic device and an actual rectifier output voltage of the additional electronic device.

12. The electronic device of claim 11, wherein adjusting the at least one operating characteristic of the inverter comprises adjusting an input voltage to the inverter and wherein the magnitude of adjustment to the input voltage is determined by multiplying the variable gain coefficient by the value.

13. The electronic device of claim 11, wherein adjusting the at least one operating characteristic of the inverter comprises adjusting an operating phase of the inverter and wherein the magnitude of adjustment to the operating phase is determined by multiplying the variable gain coefficient by the value.

14. A method of operating an electronic device configured to transfer wireless power with an additional electronic device, the electronic device comprising a wireless power transfer coil and an inverter configured to supply alternating-current drive signals to the wireless power transfer coil and the method comprising:

receiving information from the additional electronic device, wherein the information includes power feedback information;

adjusting at least one operating characteristic of the inverter using a variable gain coefficient and the power feedback information; and adjusting the at least one operating characteristic of the inverter using a predetermined gain and the power feedback information, wherein the predetermined gain is predetermined before coupling between the electronic device and additional electronic device.

15. An electronic device configured to receive wireless power from an additional electronic device, the electronic device comprising:

a wireless power transfer coil;

a rectifier connected to the wireless power transfer coil, wherein the rectifier has a target output voltage and an actual output voltage; and control circuitry configured to:

determine a first value proportional to a difference between the target output voltage and the actual voltage divided by the actual output voltage;

transmit the first value to the additional electronic device; and transmit a second value between 0 and 1 to the additional electronic device, wherein the second value influences a magnitude of a change in wireless power output, responsive to the transmitted first value, by the additional electronic device.

16. The electronic device of claim 15, wherein the control circuitry is configured to repeatedly transmit, during a power transfer phase and using the wireless power transfer coil, a first packet that comprises the first value and wherein the control circuitry is configured to transmit, before the power transfer phase and using the wireless power transfer coil, a second packet that comprises the second value.

17. The electronic device of claim 15, wherein the control circuitry is configured to transmit a first packet that comprises both the first value and the second value using the wireless power transfer coil.

18. The electronic device of claim 15, wherein the control circuitry is configured to transmit information to the additional electronic device that causes the additional electronic device to operate in a selected one of a gain linearization mode and a constant gain mode.

19. The electronic device of claim 15, wherein the control circuitry is configured to determine a magnitude of the second value based at least partially on a magnitude of a change in the actual output voltage.

* * * * *